(30.) WILLIAM H. DOBSON & WILLIAM H. DOANE.
Improvement in Scroll Sawing Machines.
No. 121,856. Patented Dec. 12, 1871.
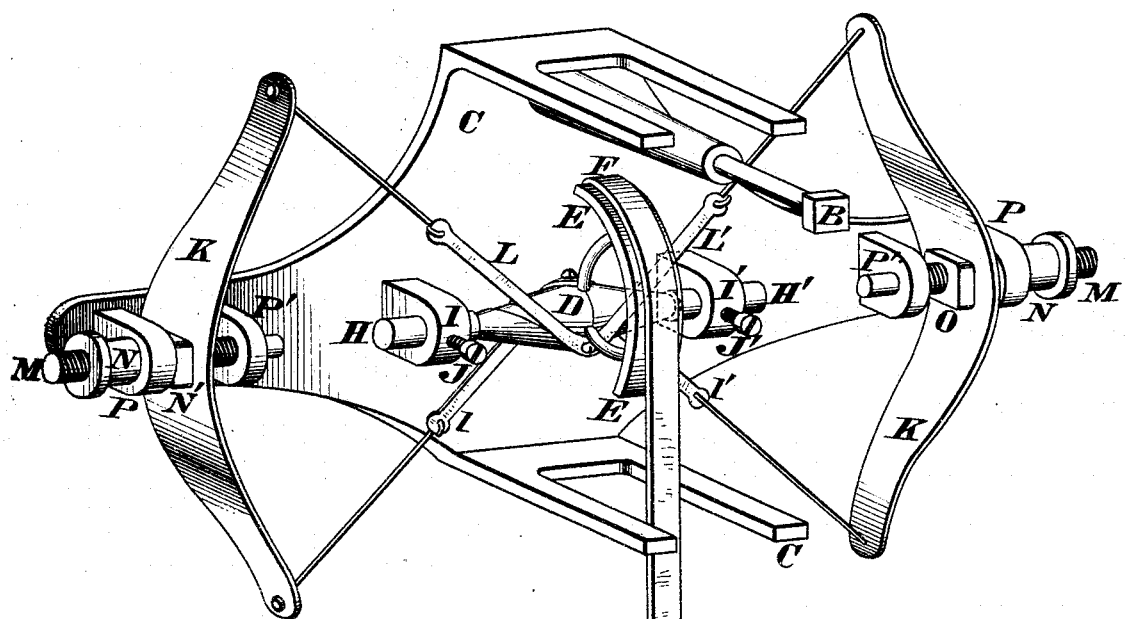
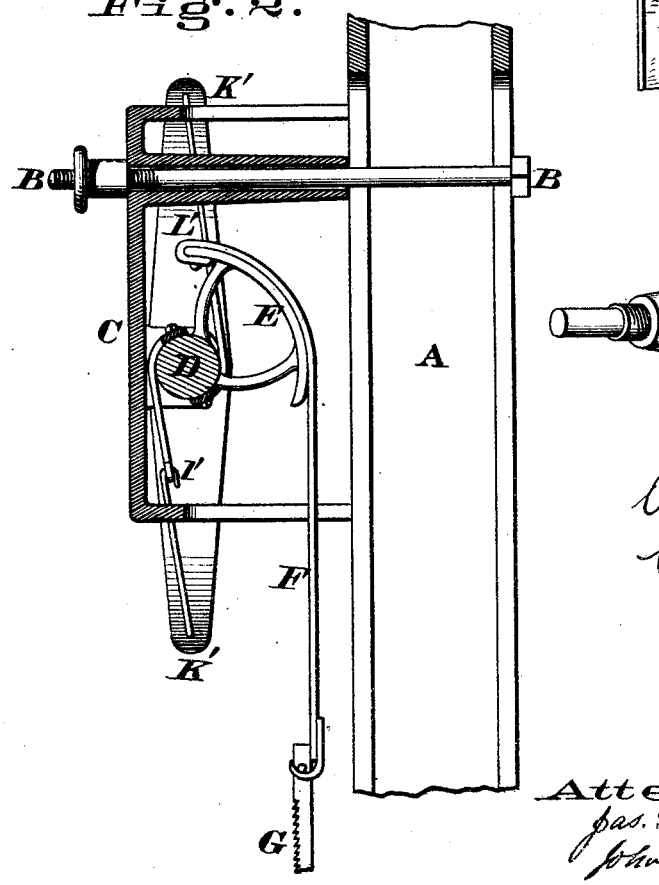
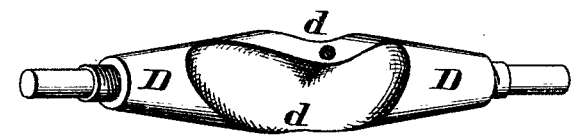
W. H. Doane
W. H. Dobson
INVENTORS.
By Knight Bros
Attys.
Attest.
Jas. H. Layman.
John Kitch

UNITED STATES PATENT OFFICE.

WILLIAM H. DOBSON AND WILLIAM H. DOANE, OF CINCINNATI, OHIO, ASSIGNORS TO J. A. FAY & CO., OF SAME PLACE.

IMPROVEMENT IN SCROLL-SAWING MACHINES.

Specification forming part of Letters Patent No. 121,856, dated December 12, 1871.

*To all whom it may concern:*

Be it known that we, WILLIAM H. DOBSON and WILLIAM H. DOANE, both of Cincinnati, Hamilton county, Ohio, have invented a new and useful Tension Device for Scroll-Sawing Machines, of which the following is a specification:

This is an improvement in devices for maintaining the proper tension of a scroll or "jig" saw.

Figure 1 is a perspective view of our device. Fig. 2 is a vertical section of the same. Fig. 3 is a perspective view of the differential cone or pulley to a larger scale.

Suitably secured to a stanchion, A, by one or more bolts, B, or otherwise, is a frame, C, in which is journaled horizontally a differential double cone-pulley, D, from whose central and thicker portion projects a segmental pulley, E, which segmental pulley is furnished with a band or strap, F, of steel, leather, or other suitably tough and flexible material, which strap is made fast in any approved way to the upper end of the saw-blade G. The gudgeons H H' of the pulley may occupy brackets I I', whose steps or bearing-surfaces may be set up by screws J J'; or said gudgeons may occupy any suitable journal-boxes. Secured to the frame C so as to intersect transversely the differential pulley's axial line, but some distance beyond said pulley, are two plate-springs, K K', whose upper ends are connected, by straps L L' or other flexible connections, to the thick central portion of said pulley on one side thereof, and whose lower ends are connected to said thick portion on the opposite side thereof by similar connections $l\ l'$. In order to enable the adjustment of the said springs, both or either one of them toward or from the differential pulley, their attachment to the frame C is through the medium of screw-bolt M and nuts N N' O to brackets P P', which project from said frame. By adjusting said springs toward each other a less and away from each other a greater tension in the saw is produced, and the same means enables the two springs to be accurately equalized in tension. It will be seen that the downward or effective stroke of the saw causes the straps L L' $l\ l'$ to be wound upon the pulley D; but as they become so wound they occupy a smaller and smaller part of the pulley, which thereby acquiring a reduced purchase upon the saw, just compensates the increased tension of the springs, and vice versa, so as to produce a uniform tension of the saw. The portions of the periphery of the differential pulley occupied by the straps L L' $l\ l'$ may be conical, as shown, to secure the described differential action. For this purpose it is essential that the pulley should decrease in thickness toward the ends, but not that it be strictly conical, as it may have an oval or other transverse section. Those portions of the periphery of the pulley D not opposed to the straps may be excavated, as shown at $d$, so as to lighten the pulley. The springs K K' may be parallel with the axis of the differential pulley instead of being transverse to said axis.

The control of this principle is reserved in its application to mortising-machine chisels and other reciprocating devices.

We claim herein as new and of our invention—

1. The differential pulley D, connected by segment pulley E and strap F with the saw, and by one or more flexible connections, L L' $l\ l'$, with the described or other suitable springs K K', for the purpose set forth.

2. The bolts M, nuts N N' O, and brackets P P' for securing and adjusting the springs K K', substantially as described.

In testimony of which invention we hereunto set our hands.

WILLIAM H. DOBSON.
WILLIAM H. DOANE.

Witnesses:
GEO. H. KNIGHT,
JAMES H. LAYMAN.